June 23, 1942.           C. L. GUIDRY           2,287,610
                  CREAM CHEESE BOX OR CARTON
                      Filed Nov. 9, 1939

Inventor
Charles L. Guidry
By L. F. Randolph
Attorney

Patented June 23, 1942

2,287,610

UNITED STATES PATENT OFFICE 2,287,610

CREAM CHEESE BOX OR CARTON

Charles Louis Guidry, New Orleans, La., assignor of one-half to L. P. Forrester, New Orleans, La.

Application November 9, 1939, Serial No. 303,686

1 Claim. (Cl. 229—15)

This invention relates to a cream cheese box or carton or the equivalent, and it is designed to provide in an exceedingly simple and inexpensive manner, for the packing or carrying therein, of the cream cheese and the cream separated from each other so that the cream need not be added to the cheese until the latter is to be served, thereby avoiding the premature souring effect of the cheese on the cream, which reduces the food value and impairs the taste.

It is aimed to provide such a box, having an outwardly struck bead, providing an internal shoulder to removably suspend a receptacle to contain the cream above the cheese and such a groove as will accommodate the closure for the box or carton, and as well securely fasten the receptacle in the groove and close the entrance to the latter.

The more specific objects and advantages will become apparent from a consideration of the description following taken in connection with accompanying drawing illustrating an operative embodiment.

Figure 1:
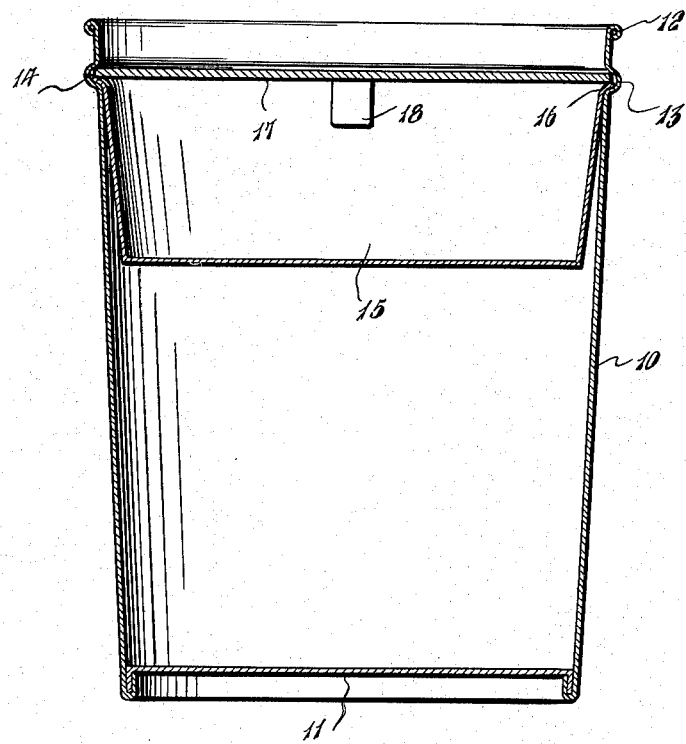
Figure 1 is a view in central vertical section illustrating the invention.
Figure 3:
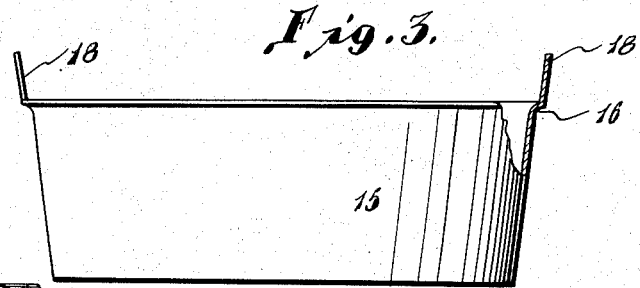
Figure 3 is a side elevation of the cream receptacle, being partly in section to disclose details.
Figure 2:
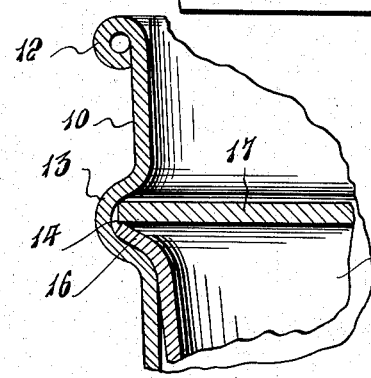
Figure 2 is an enlarged detail view in longitudinal section particularly showing the bead and fragments of the closure and receptacle in connection therewith.

Referring specifically to the drawing wherein like reference characters designate like or similar parts, 10 represents a box or carton preferably made of pasteboard or like material and usually waxed or waterproof, the same having a bottom at 11 and being open at the top, with a reinforcing bead 12 provided if desired.

At a suitable distance below but relatively close to the top of the box 10, an outwardly struck continuous rib 13 is formed, preferably arcuate in cross section, as shown, and producing an interior groove 14.

A receptacle 15 is adapted to be carried within the box 10, as shown in Figure 1, and such receptacle is preferably made of the same material as the box 10, the upper edge of the side wall thereof being flared outwardly as at 16 and of such size that it will rest on the inner surface or shoulder at the groove 14, whereby the receptacle 15 is suspended within the box 10.

In the use of the device, the cream is placed within the receptacle 15 and the cream cheese is placed within the carton or box 10 below the receptacle 15. Thereafter a closure disk 17, of the same material as the box 10 and receptacle 15 is depressed into the groove 14. Such closure 17 fits tightly in the groove 14 so as to effectively close the receptacle 15 at the flared portion 16, holding the latter tightly in place, as well as serving as a closure for the box 10.

It will be realized that the upper portion of the receptacle 15 and closure 17 are of such diameter that they contract as they are passed downwardly through the upper portion of the box 10 and then expand into the groove 14.

One or more tabs 18, may be formed integral with the receptacle 15 at the upper edge so that they may be grasped as an aid in removing the receptacle 15. Such tabs 18 may be folded downwardly as suggested in Figure 1, when the closure 17 is in place.

Various changes may be resorted to provided they fall within the spirit and scope of the invention.

I claim as my invention:

In combination with a receptacle having a rib about the same providing an interior groove, a receptacle within the first receptacle having an outwardly extending upper portion of greater diameter than the interior of the first receptacle at the entrance to the groove suspended in said groove, and a closure disposed in said groove above said portion of greater diameter than the interior of the first receptacle at the entrance to the groove.

CHARLES L. GUIDRY.